United States Patent [19]

Yamauchi et al.

[11] Patent Number: 4,764,559

[45] Date of Patent: Aug. 16, 1988

[54] POLYPHENYLENE ETHER-POLYPROPYLENE RESIN COMPOSITION

[75] Inventors: Shin-ichi Yamauchi; Yusuke Arashiro; Kenyu Ohno, all of Mie, Japan

[73] Assignee: Mitsubishi Petrochemical Co., Ltd., Tokyo, Japan

[21] Appl. No.: 120,838

[22] Filed: Nov. 16, 1987

[30] Foreign Application Priority Data

Nov. 18, 1986 [JP] Japan ................. 61-274340

[51] Int. Cl.[4] .................................. C08L 71/04
[52] U.S. Cl. ................................. 525/92; 525/905
[58] Field of Search ......................... 525/92, 905

[56] References Cited

U.S. PATENT DOCUMENTS

| | | | |
|---|---|---|---|
| 4,154,712 | 5/1979 | Lee, Jr. | 525/93 |
| 4,383,082 | 5/1983 | Lee, Jr. | 525/905 |
| 4,448,931 | 5/1984 | Sugio et al. | 525/905 |

Primary Examiner—Jacob Ziegler
Attorney, Agent, or Firm—Oblon, Fisher, Spivak, McClelland & Maier

[57] ABSTRACT

A resin composition is described, comprising (a) a polyphenylene ether resin having a low degree of polymerization or a mixture thereof with a styrene resin, (b) a polyolefin resin, and (c) a styrene compound/conjugated diene block copolymer or a hydrogenation product thereof at a specific compounding ratio. The composition is excellent in melt processability, stiffness at elevated temperatures, and impact strength.

27 Claims, No Drawings

POLYPHENYLENE ETHER-POLYPROPYLENE RESIN COMPOSITION

FIELD OF THE INVENTION

This invention relates to a resin composition excellent in melt processability, stiffness at elevated temperatures, impact strength, and resistance to chemicals. More particularly, it relates to a molding material comprising a polypropylene resin, excellent in melt processability and resistance to chemicals, widely employed in industry, a specific polyphenylene ether resin, and a specific styrene derivative/conjugated diene block copolymer, which has both characteristics of a polypropylene resin and high temperature resistance of a polyphenylene ether resin as well as improved impact strength and thereby satisfies a high level of performance required for constructing parts of automobiles and appliances.

BACKGROUND OF THE INVENTION

A polypropylene resin is a typical molding material having melt processability, mechanical strength, resistance to chemicals, and the like in an excellent balance, but the application to be made of it is limited in the field demanding high temperature resistance.

On the other hand, a polyphenylene ether resin is recognized as an engineering plastic having excellent high temperature resistance and mechanical properties but has a disadvantage of difficulty in molding due to its poor melt-fluidity characteristics.

Hence, a resin composition comprising a polypropylene resin and a polyphenylene ether resin having the respective disadvantages of these resins compensated without impairing the respective advantages would be an excellent molding material of broader application. To this effect, various compositions have been proposed. For example, Japanese Patent Publication No. 7069/67 discloses a composition comprising polyphenylene ether and polyolefin. However, since these two resin components are essentially incompatible with each other, the compounding ratios are limited so that the intended purposes cannot be achieved. Japanese Laid-Open Patent Application No. 88960/79 discloses that a large quantity of a polyolefin resin may be compounded to a polyphenylene ether resin with satisfactory compatibility in the presence of an elastomeric styrene/butadiene/styrene triblock copolymer. However, as described in the publication, if the total amount of the polyolefin and the elastomer exceeds 30% by weight, phase separation is apt to take place and the bending strength is seriously reduced, which is assumed to result in deterioration of stiffness that is an important characteristic of a molding material. Further, Japanese Laid-Open Patent Application No. 103557/83 (corresponding to U.S. Pat. No. 4,383,082) discloses a composition comprising polyphenylene ether, polyolefin, and a styrene/butadiene block copolymer, in which the polyolefin is present in an amount of 20 parts by weight or more per 100 parts by weight of the composition. However, there is still room for further improvement on stiffness, particularly stiffness at elevated temperature, that is subject to the influence of an increase in the ratio of the polyolefin component. Furthermore, U.S. Pat. No. 4,154,712 teaches to combine a low-molecular weight polyphenylene ether resin with a block copolymer of an aromatic vinyl compound and a conjugated diene compound, but the result achieved is confined to improvement on mechanical properties of this two-component system.

SUMMARY OF THE INVENTION

The inventors have extensively studied to realize a highly satisfactory balance of melt processability resistance to chemicals (i.e., resistance to organic solvent), and mechanical strength of a polyolefin-polyphenylene ether composition. As a result, it has been unexpectedly found that a resin composition having very excellent stiffness, particularly stiffness at elevated temperatures, impact strength, particularly low-temperature impact strength, melt processability, and resistance to chemicals can be obtained by compounding a specific polyphenylene ether resin having a low degree of polymerization to a styrene compound/conjugated diene block copolymer having a specific structure and a polyolefin resin, in contrast to the conventional knowledge that addition of such a low-molecular weight polyphenylene ether resin is unsuitable because mechanical strength is proportional to a degree of polymerization.

The present invention provides a resin composition having an excellent balance of melt processability, stiffness, particularly stiffness at elevated temperatures, and impact resistance, particularly low-temperature impact resistance, which comprises (a) from 20 to 80% by weight of a polyphenylene ether resin having an intrinsic viscosity of less than 0.4 dl/g in chloroform at 30° C. or a mixture of such a polyphenylene ether resin and a styrene resin, (b) from 10 to 80% by weight of a polyolefin resin selected from a propylene homopolymer, a propylene copolymer consisting mainly of propylene, and a mixture of such a propylene homo- or copolymer and other α-olefin polymer, and (c) from 2 to 40% by weight of a block copolymer comprising a styrene polymer block and a conjugated diene polymer block or a hydrogenation product thereof in which the conjugated diene polymer block is hydrogenated.

In a preferred embodiment of the present invention, the total amount of the components (b) and (c) is from 30% to 80% by weight based on the total amount of the components (a), (b), and (c), and the ratio of the component (c) to the component (b) is from 0.1 to 2.

DETAILED DESCRIPTION OF THE INVENTION

The polyphenylene ether resin which can be used in the present invention as component (a) is a polymer obtained by oxidative coupling polymerization of one or more of phenol compounds represented by formula:

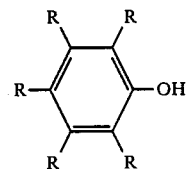

wherein the plural R's, which may be the same or different, each represents a hydrogen atom, a halogen atom, a hydrocarbon group, a halogenated hydrocarbon group, or a hydrocarbonoxy group.

Specific examples of the phenol compound having the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2,3,5-, 2,3,6- or 2,4,6-trimethylphenol, 3-methyl-6-butylphenol, p-hydroxystyrene, etc. In addition, copolymers comprising the above-described phenol compound and a polyhydric aromatic compound, e.g., bisphenol A, tetrabromobisphenol A, resorcin, hydroquinone, a novolak resin, 3,3'-, 5,5'-or 4,4'-dihydroxybiphenyl, 2,2'-bis(3,5-dimethyl-4-hydroxy)propane, bis(3,5-dimethyl-4-hyroxy)methane, etc., may also be employed. Of these polyphenylene ether resins, preferred are a homopolymer of 2,6-dimethylphenol, and a copolymer comprising 2,6-dimethylphenol as a major unit and one or more than two comonomer(s) selected from 2,3,6-trimethylphenol, 2,4,6-trimethylphenol, o-cresol, p-cresol and 2,2'-bis(3,5-dimethyl-4-hydroxy)propane as a minor unit(s).

These polyphenylene ether resins can be prepared by known processes, such as the processes described in U.S. Pat. Nos. 3,306,874, 3,306,875 and 3,257,357.

An oxidative coupling catalyst to be used in the oxidative polymerization is not particularly limited, and any catalyst can be used as far as the resulting polymer may have a degree of polymerization as desired in the present invention. Usable catalysts known in the art include a cuprous salt-tertiary amine system, a cupric salt-amine-alkali metal hydroxide system, a maganese salt-primary amine system, and many others. The degree of polymerization can be controlled as desired by varying a solvent to non-solvent ratio for polymerization as described in U.S. Pat. No. 3,440,217 and Japanese Laid-Open Patent Application No. 25095/74 or by controlling a polymerization time as described in Japanese Laid-Open Patent Application No. 19329/83.

Modified polyphenylene ether resins in which a part of the constituting component has been modified by the action of the catalyst or by oxidation with oxygen during polymerization or molding are also employable. Further, graft polymers in which a small amount of a styrene compound or other monomer is grafted to the above-described polyphenylene ether resin can also be used.

As an unanticipated and also important contributing factor to the present invention, the intrinsic visosity, a measure for a degree of polymerization, of the polyphenylene ether resin to be used should be less than 0.4 dl/g as determined in chloroform at 30° C. (measurement conditions will be hereinafter the same), preferably not less than 0.15 dl/g, and more preferably from 0.2 to 0.37 dl/g. It has been considered in the art that resins for providing useful molding materials should generally have an intrinsic viscosity of at least 0.4 dl/g. In view of this common knowledge in the art, it is utterly unexpected that stiffness and impact strength of a composition comprising a polyolefin resin, a specific block copolymer, and a polyphenylene ether resin can be improved by using a polyphenylene ether resin having a low degree of polymerization in place of that having a high degree of polymerization, as proposed in the present invention.

The component (a) according to the present invention may be a mixture of the above-described polyphenylene ether resin and a styrene resin.

The styrene resin to be used is a resin comprising styrene or a derivative thereof as a major component and having satisfactory compatibility with polyphenylene ether. Specific examples of such a styrene resin include polystyrene, high-impact polystyrene, polymethylstyrene, poly-α-methylstyrene, a styrene-α-methylstyrene copolymer, a styrene-maleic anhydride copolymer, a styrene-(meth)-acrylic acid copolymer, a styrene-glycidylmethacrylate copolymer, a styrene-butadiene random copolymer or a hydrogenation product thereof, a styrene-acrylonitrile copolymer, an ABS resin, and the like. As the proportion of the styrene resin in the component (a) increases, the resulting resin composition would have increased fluidity with reduced high temperature resistance. The proportion of the styrene resin can be selected according to the end use of the composition and is usually from 0 to 50% by weight, preferably from 0.1 to 50% by weight, and more preferably from 0.1 to 30% by weight, based on the total amount of the polyphenylene ether and the styrene resin.

The proportion of the component (a) in the resin composition ranges from 20 to 80% by weight, preferably from 30 to 70% by weight, and more preferably from 40 to 60% by weight, based on the total amount of the components (a), (b), and (c).

The polyolefin resin which can be used as component (b) in the present invention includes a homopolymer of propylene, a copolymer comprising propylene as a main component (such a propylene homo- or copolymer will hereinafter be inclusively referred to as a propylene polymer), and a mixture of the propylene polymer with other α-olefin polymer, consequently the polyolefin resin containing a propylene unit as a major component.

In these polymers comprising a propylene unit as a major component, the crystalline component derived from the propylene unit preferably has a melting point of 130° C. or higher from the standpoint of high temperature resistance, fluidity, and economy. Examples of the component (b) include a propylene homopolymer, a block or random copolymer of propylene and other α-olefin(s), and a mixture of such a propylene polymer with other α-olefin polymer(s). Specific examples of the α-olefin unit in the propylene copolymer are ethylene, propylene, 1-butene, 1-pentene, 1-hexene, 3-methyl-butene-1, 3-methyl-pentene-1,4-methyl-pentene-1, and 1-octene. Specific examples of the other α-olefin polymer to be combined with the propylene polymer include a propylene/α-olefin copolymer containing a minor proportion of propylene, and a homo- or copolymer of an α-olefin other than propylene, as well as an α-olefin olefin copolymer containing a small amount of a vinyl monomer or a non-conjugated diene.

Specific examples of the polyolefin resin as the component (b) include polypropylene, a propylene/ethylene copolymer containing a propylene unit in a major proportion, and a mixture of polypropylene and an ethylene/propylene rubber or polyethylene containing polypropylene in a major proportion. Comonomers which may be present in the polyolefin resin in a small proportion includes aromatic vinyl compounds, e.g., styrene, methylstyrene, etc.; vinylsilane compounds, e.g., vinyltrimethylmethoxysilane, vinyltriethoxysilane, etc.; unsaturated fatty acids and derivatives thereof, e.g., acrylic acid, methacrylic acid, maleic acid, maleic anhydride, methyl methacrylate, etc.; and non-conjugated diene compounds, e.g., dicyclopentadiene, 4-ethylidene-2-norbornene, 4-methyl-1,4-hexadiene, 5-methyl-1,4-hexadiene, etc.

The polyolefin resin (b) preferably has a melt flow rate (MFR) usually ranges from 0.01 to 150 g/10 min, preferably from 0.05 to 70 g/10 min, and more preferably from 0.1 to 50 g/10 min, as measured at 230° C. under a load of 2.16 kg in accordance with JIS K7210-1975.

The above-described polyolefin resins can be obtained by known processes, and they may be used either individually or in combinations thereof.

Preferred among these polyolefin resins are a crystalline propylene homopolymer and a crystalline propylene/ethylene block or random copolymer having a propylene content of from 60 to 99% by weight, preferably from 70 to 99% by weight, and more preferably from 80 to 95% by weight, and mixtures of these propylene polymers and an α-olefin copolymer having rubbery properties and containing not more than 50% by weight of a propylene unit, such as an ethylene/propylene copolymer, an ethylene/butene copolymer, an ethylene/propylene/butene copolymer, and these α-olefin copolymers containing a small amount of a nonconjugated diene comonomer.

The proportion of the other α-olefin polymer in the polyolefin resin (b) ranges from 1 to 50% by weight, preferably from 1 to 40% by weight, and more preferably from 5 to 30% by weight. The mixture of the propylene polymer with the other α-olefin polymer can be obtained by separately preparing these polymers and then mixing them by melt-kneading or solution mixing or mixing them at the time of mixing with the components (a) and (c). The mixture can also be obtained by first preparing either of the propylene polymer and the other α-olefin polymer and subsequently polymerizing the other in the same polymerization system.

The propylene copolymer comprising propylene as a main component preferably has a high crystallinity as possible from the standpoint of ensuring stiffness, particularly stiffness at elevated temperatures. In general, impact strength increases with an increase in ethylene content, but a high ethylene content exceeding 40% by weight tends to reduce stiffness of the resulting molding material.

The proportion of the above-described rubbery α-olefin copolymer can be selected according to the end of the composition chiefly aiming at improvement on impact strength. It should be noted, however that the increase of the proportion of the other α-olefin polymer is attended by significant reduction in stiffness and proportions of 50% by weight or more fail to meet the final purposes.

The proportion of the component (b) in the resin composition ranges from 10 to 80% by weight, preferably from 20 to 80% by weight, and more preferably from 30 to 70% by weight, based on the total amount of the components (a), (b), and (c). As the proportion of the component (b) increases, the characteristic of the propylene polymer, such as melt processability, resistance to chemicals, and the like, would become pronounced but high temperature resistance of the resulting resin composition would be deteriorated. The ratio of the component (b) to the total amount of the components (a) and (b) preferably ranges from 10 to 78% by weight, more preferably from 20 to 70% by weight, and most preferably from 30 to 60% by weight.

The component (c) according to the present invention includes a block copolymer comprising a styrene polymer block and a conjugated diene polymer block and a hydrogenation product thereof in which the diene polymer block is hydrogenated.

The block copolymer or hydrogenated block copolymer (c) usually has a number average molecular weight of from 30,000 to 150,000, preferably from 40,000 to 120,000, and more preferably from 50,000 to 100,000, as determined by gel-permeation chromatography (GPC) on a standard polystyrene scale.

The styrene polymer block constituting the component (c) usually has a degree of polymerization of from 30 to 200, and preferably from 60 to 150. It is preferable that the average degree of polymerization of the styrene polymer block does not exceed that of the conjugated diene polymer block and, at the same time, exceeds that of the polyphenylene ether in the component (a).

The proportion of the styrene polymer block in the block copolymer (c) usually ranges from 5 to 60% by weight, and preferably from 10 to 40% by weight.

The mode of block arrangement is not particularly restricted and includes diblock, triblock, multiblock, tapered block, radial tereblock, and the like arrangement. Diblock and triblock arrangements are preferred. In particular, styrene polymer block-terminated triblock copolymers and hydrogenation products thereof are preferred.

Monomers constituting the styrene polymer block include styrene, bromostyrene, chlorostyrene, α-methylstyrene, p-methylstyrene, and vinylxylene. Monomers constituting the conjugated diene polymer block include 1,3-butadiene, isoprene, and 1,3-pentadiene. Specific examples of the styrene compound/conjugated diene block copolymer include a styrene/butadiene diblock copolymer or a hydrogenation product thereof, a styrene/isoprene diblock copolymer or a hydrogenation product thereof, a styrene/butadiene/styrene triblock copolymer or a hydrogenation product thereof, and a styrene/isoprene/styrene triblock copolymer or a hydrogenation product thereof.

In the case of using a hydrogenation product of the styrene compound/conjugated diene block copolymer as the component (c), hydrogenation of the block copolymer is preferably effected to such an extent that the degree of unsaturation of the conjugated diene polymer block is reduced to 20% or less of the initial degree. In particular, in order to obtain a resin composition comprising the polyphenylene ether resin in a large proportion by melt-kneading, it is preferable to use the block copolymer in which the unsaturated groups of the conjugated diene component having poor thermal stability are substantially hydrogenated. In this case, the most preferred hydrogenated block copolymer to be used is a hydrogenated styrene/butadiene/styrene triblock copolymer having a degree of unsaturation of a butadiene component reduced to 10% or less of the initial degree.

The proportion of the component (c) in the resin composition of the present invention ranges from 2 to 40% by weight, and preferably from 5 to 30% by weight, based on the total amount of the components (a), (b), and (c). As the proportion of the component (c) increases, the resulting resin composition has improved impact strength but, in turn, reduced high temperature resistance and stiffness, particularly stiffness at elevated temperatures.

The block copolymers to be used in the present invention are easily available as commercial products, such as "Califlex TR" (styrene/isoprene/styrene triblock copolymers sold by Shell Chemical Co.), "Kraton G" (hydrogenated styrene/butadiene/styrene triblock copolymers and hydrogenated styrene/isoprene diblock copolymers sold by Shell Chemical Co.), "Solprene T" (styrene/butadiene radial block copolymers sold by Phillips Petroleum Co.), "TR" (styrene/butadiene/styrene triblock copolymers sold by Japan Synthetic Rubber Co., Ltd.), and "Toughprene" (products sold by Asahi Chemical Industry Co., Ltd.). If desired, these block copolymers can be synthesized with reference to publications, e.g., Japanese Patent Publication No. 23798/65, U.S. Pat. No. 3,994,856, and British Pat. No. 1,145,923. The method for hydrogenation of the conjugated diene block is also known. The hydogenation catalyst to be used includes noble metal catalysts, e.g., platinum, nickel catalysts, copper-chromium catalysts, etc. Specific examples of the methods for hydrogenation are described, e.g., in Japanese Patent Publication Nos. 8704/67 and 6636/68 and U.S. Pat. No. 3,696,088.

The proportion of the total amount of the components (b) and (c) in the resin composition preferably ranges from 30 to 80% by weight based on the total amount of the components (a), (b), and (c). The ratio of the component (c) to the component (b) preferably ranges from 0.1 to 2, and more preferably from 0.2 to 1. The amount of the component (b) to be compounded can be selected appropriately according to requirements for improvement on melt processability, resistance to chemicals and impact strength.

The resin composition according to the present invention can be prepared by any method, such as a method of mixing the components in various kneaders, e.g., a single screw extruder, a twin screw extruder, a Banbury mixer, etc. and a method in which the components in the form of a solution or suspension are mixed and the solvent is removed therefrom or a common non-solvent is added to the mixture to recover the composition as a precipitate. The components may be mixed in any possible order. From the standpoint to economy, it is desirable to mix all the components simultaneously. In the case where the mixing is effected by melt-kneading, the components may be successively mixed in the order of their viscosity from high to low.

The composition may further contain rubbery polymers, inorganic fillers, such as glass fiber, potassium titanate whiskers, talc, precipitated calcium carbonate, etc., pigments, stabilizers, and the like according to necessity on practical use.

The present invention will be illustrated in greater detail with reference to Examples and Comparative Examples. The examples, however, do not limit the scope of the invention. In these examples, all the percents are by weight unless otherwise indicated.

EXAMPLES 1 TO 5 AND COMPARATIVE EXAMPLES 1 TO 4

Prescribed amounts of the components shown in Table 1 were thoroughly mixed with stirring in a supermixer, melt-kneaded in a twin screw extruder ("PCM" manufactured by Ikegai Iron Works, Ltd.) at 280° C., and extruded in strands, followed by cutting into pellets.

The pellets were injection-molded in an injection molding machine ("M40A-SJ" manufactured by Meiki Seisakusho) at a cylinder temperature of 280° C. and a mold cooling temperature of 60° C. to prepare specimens for physical testing.

The components used in sample preparation were as follows.

(1) Component (a):

Low molecular weight PPE: Poly-2,6-dimethyl-1,4-phenylene ether prepared by Mitsubishi Petrochemical Co., Ltd. on an experimental basis (intrinsic viscosity: 0.28 dl/g).

High molecular weight PPE: Poly-2,6-dimethyl-1,4-phenylene ether prepared by basis (intrinsic viscosity: 0.47 dl/g).

Low molecular weight PPE and High molecular weight PPE had the respective degrees of polymerization of about 84 and about 230 on a standard polystyrene scale as measured by GPC at 45° C. using tetrahydrofuran as an eluent.

HF-77: Trade name of Polystyrene produced by Mitsubishi Monsant Chemical Co., Ltd.

(2) Component (b):

A: Polypropylene produced by Mitsubishi Petrochemical Co., Ltd. (MFR*: 1.6; propylene content: 100%).

B: Propylene/ethylene block copolymer produced by Mitsubishi Petrochemical Co., Ltd. (MFR*: 1.2; propylene content: 85%).

C: Propylene/ethylene copolymer produced by Mitsubishi Petrochemical Co., Ltd. (MFR*: 45; propylene content: 92.5%).

*: The MFR of these polyolefin polymers (A, B, and C) was measured at 230° C. under a load of 2.16 kg in accordance with JIS K7210-1975.

(3) Block Copolymer (c):

Kraton-G1652: Trade name of a hydrogenated styrene/butadiene/styrene triblock copolymer produced by Shell Chemical Co.

Kraton-GX1701: Trade name of a hydrogenated styrene/isoprene diblock copolymer produced by Shell Chemical Co.

TR-2000: Trade name of a styrene/butadiene/styrene triblock copolymer produced by Japan Synthetic Rubber Co., Ltd.

Kraton-G1652 was found to have a styrene content of 30%, a number average molecular weight of 64,500 as determined by GPC on a standard polystyrene scale, a degree of polymerization of 93 in its styrene block and 836 in its hydrogenated butadiene block as calculated as a homogeneous triblock copolymer, and a molar ratio of the residual unsaturated bonds to the hydrogenated bonds of 1% or less as determined by 13C-NMR analysis. Similarly, Kraton-GX1701 was found to have a styrene content of 37%, a number average molecular weight of 118,000 as determined by GPC on a standard polystyrene scale, and a degree of polymerization of 420 in its styrene block. TR-2000 was found to have a styrene content of 40%, a number average molecular weight of 80,900 as determined by GPC on a standard polystyrene scale, and a degree of polymerization of 156 in its styrene block.

Various physical properties of the resulting resin compositions were measured or evaluated by the following methods, and the results obtained are shown in Table 1.

(1) Flexural Modulus:

Measured in accordance with ISO R178-1974 Procedure 12 (JIS K7203) by means of an Instron tester. Prior to the measurement at 80° C., a specimen, a specimen support, and a pressure check wedge were placed in a hot-air thermostat and conditioned in an atmosphere of 80° C.±1° C. for at least 20 minutes.

(2) Izod Impact Strength:

Measured in accordance with ISO R180-1969 (JIS K7110) (notched Izod impact strength) by means of an Izod impact tester manufactured by Toyo Seiki Seisakusho.

(3) Dart Drop Impact Strength:

A load-sensing dart (2 m×7 kgf) was fallen on a specimen (120 mm×80 mm×2 mm) set on a support (hole diameter: 40 mm) to determine deformation and destruction behaviors under impact load. An impact energy absorbed up to the point of crack initiation in the resulting impact pattern was calculated to obtain an impact strength (absorbed energy) (kg.cm).

(4) MFR:

Measured at 280° C. under a load of 5 kg in accordance with JIS K7210-1975.

(5) Resistance to Chemicals:

Measured in accordance with a Bergen's ¼ elliptical jig method [cf. *SPE Journal,* 667 (1962)]. Specifically, a 2 mm thick specimen was fixed at a ¼ elliptical jig (major axis: 24 cm; minor axis: 8 cm) and dipped in a 1:9 (by volume) mixed solvent of toluene and hexane for 3 minutes. The minimum strain at which a crack initiated was determined and rated according to the following scale.

Excellent: No crazing was observed.
Good: Threshold crazing strain was 1.5% or more.
Acceptable: Threshold crazing strain was between 1.0% and 1.5%.
Poor: Threshold crazing strain was less than 1.0%.

TABLE 1

|  | Example No. | | | | | Comparative Example No. | | | |
|---|---|---|---|---|---|---|---|---|---|
|  | 1 | 2 | 3 | 4 | 5 | 1 | 2 | 3 | 4 |
| Composition* | | | | | | | | | |
| Component (a): | | | | | | | | | |
| Low molecular weight PPE | 39 | 39 | 54 | 26 | 39 | — | — | 39 | — |
| High molecular weight PPE | — | — | — | — | — | 39 | 39 | — | 54 |
| HF-77 | 13 | 13 | — | 9 | 13 | 13 | 13 | 13 | — |
| Component (b): | | | | | | | | | |
| A | — | — | 23 | 52 | — | — | — | — | 23 |
| B | 35 | 35 | — | — | — | 35 | 35 | 35 | — |
| C | — | — | — | — | 35 | — | — | — | — |
| Component (c): | | | | | | | | | |
| Kraton-G1652 | 13 | — | — | 13 | 13 | 13 | — | — | — |
| Kraton-GX1701 | — | — | 23 | — | — | — | — | — | 23 |
| TR-2000 | — | 13 | — | — | — | — | — | — | — |
| Physical Properties | | | | | | | | | |
| MFR (g/10 min) | 36 | 8.2 | 28 | 52 | 80 | 12 | 14 | 16 | 7.7 |
| Flexural Modulus (kg/cm³) | | | | | | | | | |
| at 23° C. | 12,500 | 13,000 | 12,100 | 10,700 | 10,500 | 7,400 | 19,200 | 18,400 | 8,900 |
| at 80° C. | 8,600 | 7,300 | 6,100 | 5,900 | 6,500 | 3,900 | 12,100 | 12,300 | 3,800 |
| Izod Impact Strength (kg · cm/cm) | | | | | | | | | |
| at 23° C. | 20.0 | 6.5 | 22.3 | 28.2 | 12.5 | 19.3 | 2.7 | 2.0 | 23.4 |
| at −30° C. | 10.4 | 3.8 | 15.4 | 9.2 | 8.0 | 9.2 | 1.9 | 1.9 | 10.1 |
| Dart Drop Impact Strength (kg · cm) | | | | | | | | | |
| at 23° C. | 170 | 16 | 130 | 99 | 92 | 130 | 3.7 | 1.8 | 98 |
| at −30° C. | 65 | 5 | 75 | 54 | 28 | 43 | 2.8 | 1.8 | 51 |
| Resistance to Chemicals | good | good | acceptable | good | good | good | acceptable | good | acceptable |

Note:
*Unit is % by weight.

While the invention has been described in detail and with reference to specific embodiments thereof, it will be apparent to one skilled in the art that various changes and modifications can be made therein without departing from the spirit and scope thereof.

What is claimed is:

1. A resin composition comprising (a) from 20 to 80% by weight of a polyphenylene ether resin having an intrinsic viscosity of less than 0.4 dl/g in chloroform at 30° C. or a mixture of such a polyphenylene ether resin and a styrene resin, (b) from 10 to 80% by weight of a polyolefin resin selected from the group consisting of a propylene homopolymer, a propylene copolymer consisting mainly of propylene, and a mixture of such a propylene homo- or copolymer with other α-olefin polymer, and (c) from 2 to 40% by weight of a block copolymer comprising a styrene polymer block and a conjugated diene polymer block or a hydrogenation product thereof in which the conjugated diene polymer block is hydrogenated.

2. A resin composition as claimed in claim 1, wherein the total amount of the components (b) and (c) is from 30% by weight to 80% by weight based on the total amount of the components (a), (b), and (c), and the ratio of the component (c) to the component (b) is from 0.1 to 2.

3. A resin composition as claimed in claim 1, wherein said polyphenylene ether resin has an intrinsic viscosity of not less than 0.15 dl/g.

4. A resin composition as claimed in claim 1, wherein said polyphenylene ether resin has an intrinsic viscosity of from 0.2 dl/g to 0.37 dl/g.

5. A resin composition as claimed in claim 1, wherein said styrene resin is present in an amount of from 0.1 to 50% by weight based on the total amount of the polyphenylene ether resin and the styrene resin.

6. A resin composition as claimed in claim 1, wherein said polyolefin resin has a melt flow rate of from 0.01 to 150 g/10 min.

7. A resin composition as claimed in claim 1, wherein said polyolefin resin has a melt flow rate of from 0.05 to 70 g/10 min.

8. A resin composition as claimed in claim 1, wherein said polyolefin resin has a melt flow rate of from 0.1 to 50 g/10 min.

9. A resin composition as claimed in claim 1, wherein said polyolefin resin has a propylene content of more than 50% by weight.

10. A resin composition as claimed in claim 1, wherein said polyolefin resin has a propylene content of from 60 to 99% by weight.

11. A resin composition as claimed in claim 1, wherein said polyolefin has a propylene content of from 70 to 99% by weight.

12. A resin composition as claimed in claim 1, wherein said polyolefin resin has a propylene content of from 80 to 95% by weight.

13. A resin composition as claimed in claim 1, wherein said polyolefin resin is selected from the group consisting of a crystalline propylene/ethylene block copolymer, a crystalline propylene/ethylene random copolymer, and a crystalline propylene homopolymer.

14. A resin composition as claimed in claim 1, wherein said α-olefin polymer in the component (b) is a rubbery polymer having a propylene content of not more than 50% by weight selected from the group consisting of an ethylene/propylene copolymer, an ethylene/butene copolymer, and an ethylene/propylene/butene copolymer.

15. A resin composition as claimed in claim 1, wherein said block copolymer has a number average molecular weight of from 30,000 to 150,000 as measured by gel-permeation chromatography on a standard polystyrene scale.

16. A resin composition as claimed in claim 1, wherein said block copolymer has a number average molecular weight of from 40,000 to 120,000 as measured by gel-permeation chromatography on a standard polystyrene scale.

17. A resin composition as claimed in claim 1, wherein said block copolymer has a number average molecular weight of from 50,000 to 100,000 as measured by gel-permeation chromatography on a standard polystyrene scale.

18. A resin composition as claimed in claim 1, wherein the component (c) is a hydrogenated styrene/butadiene/styrene triblock copolymer.

19. A resin composition as claimed in claim 1, wherein the component (c) comprises from 5 to 60% by weight of a styrene polymer block.

20. A resin composition as claimed in claim 1, wherein the component (c) comprises from 10 to 40% by weight of a styrene polymer block.

21. A resin composition as claimed in claim 1, wherein said hydrogenation product of the block copolymer is obtained by hydrogenating the block copolymer to such an extent that the degree of unsaturation of the conjugated diene polymer block is reduced to 20% or less of the initial degree.

22. A resin composition as claimed in claim 1, wherein said composition comprises from 30 to 70% by weight of the component (a), from 20 to 80% by weight of the component (b), and from 5 to 30% by weight of the component (c).

23. A resin composition as claimed in claim 1, wherein said composition comprises from 40 to 60% by weight of the component (a), from 30 to 70% by weight of the component (b), and from 5 to 30% by weight of the component (c).

24. A resin composition as claimed in claim 1, wherein the ratio of the component (c) to the component (b) is from 0.2 to 1.

25. A resin composition as claimed in claim 1, wherein the component (b) is present in an amount of from 10 to 78% by weight based on the total amount of the component (a) and (b).

26. A resin composition as claimed in claim 1, wherein the component (b) is present in an amount of from 20 to 70% by weight based on the total amount of the components (a) and (b).

27. A resin composition as claimed in claim 1, wherein the component (b) is present in an amount of from 30 to 60% by weight based on the components (a) and (b).

* * * * *